United States Patent Office 3,620,087
Patented Nov. 16, 1971

3,620,087
FLUIDIC SPEED SENSORS
John Christopher Hammond Davis and John William
Leathers, Taplow, England, assignors to Plessey BTR
Limited, Taplow, England
Filed Dec. 1, 1969, Ser. No. 881,002
Claims priority, application Great Britain, Apr. 15, 1969,
19,188/69
Int. Cl. G01p 3/34
U.S. Cl. 73—521                                   8 Claims

ABSTRACT OF THE DISCLOSURE

A fluidic rotation speed sensing device comprises an operating surface of a rotating body disposed perpendicular to the axis of rotation thereof, a nozzle arranged to direct a jet of fluid into the boundary layer of said operating surface in a direction having a component perpendicular to the axis of rotation and a collector disposed confronting the nozzle. Due to boundary layer interaction the jet is deflected in the direction of movement of the surface so that the pressure at the collector provides an indication of the rate of rotation.

---

This invention relates to speed sensing devices and more particularly to fluidic speed sensing devices. It has particular application to sensing rotational speeds but is not limited to this.

Copending application Ser. No. 838,249 of John William Leathers discloses a fluidic speed sensor in which a jet of fluid is directed along the surface of a body whose speed of movement is to be measured in a direction which is parallel to the plane of such surface and perpendicular to the direction of movement. When the surface is moving, boundary layer interaction between the jet and the boundary layer of air or other fluid in contact with the surface causes the jet to be deflected in the same direction as the direction of movement of the surface. A collector is disposed confronting the jet and, in accordance with whether the collector is aligned with the jet or whether it is displaced with respect to the jet in the direction of movement of the surface, a maximum signal output is received when the surface is stationary or when it is moving at a predetermined speed.

When such a speed sensor is used to detect low speeds, the thickness of the boundary layer used to deflect the jet is very small. This makes deflection dependent on external conditions, particularly temperature. It is an object of the present invention to provide an arrangement which increases the thickness of the boundary layer and thus increases sensitivity and decreases the effects of external conditions.

According to the invention, the body whose speed of movement is to be measured is provided with two parallel surfaces defining a cavity through which the jet of fluid is directed. The width of the gap between the surfaces is made sufficiently small, relative to the extent thereof, to cause substantially all of the fluid enclosed therebetween to move at the same speed as the surfaces.

According to a feature of the invention, two collectors are provided, one lying behind the other in the direction of movement, so that a differential output pressure signal can be obtained which is substantially independent of the supply pressure to the jets.

The invention will be more readily understood from the following description given by way of illustrative example with reference to the accompanying drawings, in which.

Figure 1:
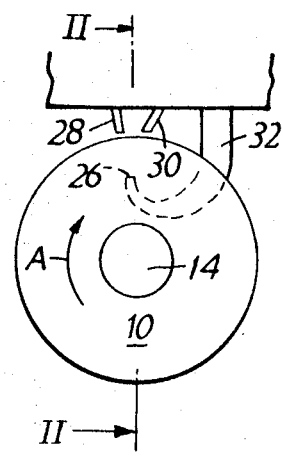
FIG. 1 is an elevational view of one embodiment of the invention.
Figure 2:
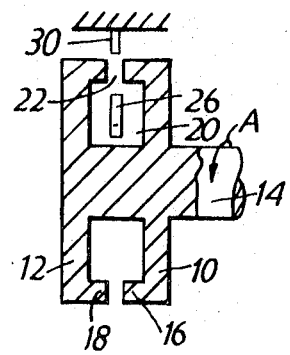
FIG. 2 is a sectional view taken on the line II–II in FIG. 1.

Referring first to FIGS. 1 and 2, a pair of discs 10 and 12 are mounted on, and secured to, a shaft 14 whose speed of rotation is to be measured. Each disc 10, 12 has a respective annular lip 16, 18 on the periphery thereof confronting the other disc. Thus, the two discs 10 and 12 almost totally enclose an annular cavity 20, the gap 22 between the lips 16 and 18 being narrow compared to the axial width of the cavity 20. A nozzle 26 is disposed within the cavity 20 and arranged to direct a jet of fluid radially outwards through the gap 22. A pair of collectors 28 and 30 are aligned confronting the gap 22 and disposed symmetrically with respect to the jet projection direction of the nozzle 26. When the shaft 14 and the discs 10, 12 thereon are stationary, the centre of the jet of fluid from the nozzle 20 impinges equally on the two collectors 28, 30 and the pressure thereat is therefore equal. If the shaft is rotated in the direction indicated by the arrow A, the pressure at the collector 30 increases and that at the collector 28 decreases.

In order to supply fluid to the nozzle 26, it is necessary to provide a supply pipe 32 leading through the narrow gap 22 between the two lips 16 and 18. This disturbs the flow in the gap but, if it is positioned as shown in FIG. 1, so that the bow wave in the fluid generated by the supply pipe 32 does not extend back to the jet, and if the overall circumference of the disc is such that there is room for the wake to settle before the collector 28 is reached, the effect on the output signal is negligibly small. The effect of the presence of the stationary jet 26 within the annular cavity 20 is minimised by giving the jet 26 and cavity 20 widely differing cross-sectional areas.

Figure 3:
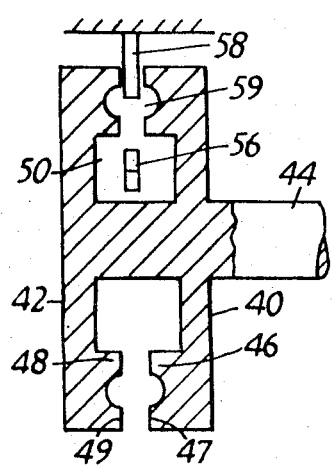
FIG. 3 is a sectional view, similar to FIG. 2, of another embodiment of the invention.

With the arrangements shown in FIGS. 1 and 2, if the collectors 28 and 30 are within or are close to the gap 22, they pick up disturbances from the edges of the discs 10 and 12. On the other hand, as the collectors are moved further from the edges of the discs 10 and 12, the effect of ambient conditions becomes more important. FIG. 3 shows an alternative arrangement comprising two discs 40 and 42 secured on a shaft 44. In this case, in addition to the lips 46 and 48 which define the sensing gap and correspond to lips 16, 18 of FIGS. 1 or 2, each disc has an additional lip 47, 49 spaced radially outwards from and concentric with the first mentioned lips 46, 48. The nozzle 56 is disposed in the annular cavity 50 as before but the collectors, one of which is shown in 58, now extend into a second annular cavity 59 formed between the lips 46 and 48 on the one hand and the lips 47 and 49 on the other. Thus the collectors, although spaced away from the edges of the lips 46 and 48, are disposed within the fluid which is rotating at substantially the same speed as the discs and is effectively isolated from ambient conditions.

Figure 4:
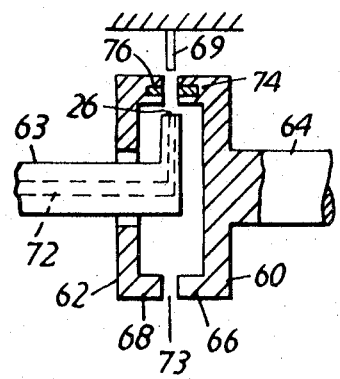
FIG. 4 is a sectional view, also similar to FIGS. 2 and 3, of a further embodiment of the invention.

Referring now to FIG. 4, only one disc 60 is rigidly mounted on a shaft 64 whose speed of rotaton is to be measured. The disc 60 is mounted on the end of the shaft 64 and a confronting disc 62 is mounted for free rotation mounted on a coaxial fixed shaft 63. As before, confronting annular lips 66 and 68 are provided on the peripheries of the discs 60 and 62 respectively. A pair of collectors, one of which is shown at 69, and a nozzle 56 are disposed in similar positions to the collectors 28 and 30 and the nozzle 26 of the embodiment shown in FIGS. 1 and 2. However, the supply pipe 72 for the nozzle 26 is located within the fixed shaft 63 and consequently does not extend through the narrow gap 73 between the two confronting flanges 66 and 68.

In order to cause the disc 62 to rotate at the same speed as the disc 60, respective magnetic inserts 74 and 76 are mounted confronting one another in the flanges 66 and 68. Either one of the magnetic members 74 and 76 is a permanent magnet and the other is of soft magnetic material or both are permanent magnets mounted with poles of opposite polarity confronting one another.

The embodiment shown in FIG. 4 may be modified by the provision of double flanges to enclose the collectors in the same way as was described with reference to FIG 3.

We claim:

1. A fluidic rotation speed sensing device for sensing the speed of rotation of a body, comprising an operating surface of said body disposed perpendicular to the axis of rotation thereof, a nozzle arranged to direct a jet of fluid along a discrete linear path into the boundary layer of said operating surface in a direction having a component perpendicular to the axis of rotation and a collector disposed confronting the nozzle.

2. A fluidic device as claimed in claim 1, further comprising a second operating surface disposed confronting said first-mentioned operating surface and arranged for rotation about the same axis, the spacing between said two operating surfaces being sufficiently small relative to the extent thereof, to cause substantially all of the fluid enclosed therebetween to move at the same speed as the surfaces.

3. A fluidic device as claimed in claim 2, having a pair of coaxial discs mounted for rotation with said body and a pair of confronting annular lips each located coaxially on a respective one of said coaxial discs, confronting edges of said annular lips being the operating surfaces.

4. A fluidic device as claimed in claim 3, in which the nozzle is disposed radially inwardly of the lips and the collector is disposed radially outwardly of the lips.

5. A fluidic device as claimed in claim 4, comprising a second pair of confronting annular lips disposed on said discs and spaced radially outwardly from said first pair of confronting annular lips to define a cavity enclosing the collector.

6. A fluidic device as claimed in claim 3, including a common shaft on which the discs are mounted.

7. A fluidic device as claimed in claim 3, in which said body comprises a shaft, one of said discs beng mounted on said shaft for rotation therewith, a stationary shaft having said other discs rotatably mounted thereon, a permanent magnet insert is provided in one of the discs, an insert of magnetic material is provided in the other disc arranged to interact wth said permanent magnet insert, whereby rotation of said first shaft causes simultaneous rotation of both discs.

8. A fluidic device as claimed in claim 7, including a duct in said stationary shaft and connected to the nozzle for supplying fluid thereto.

References Cited
UNITED STATES PATENTS

| | | | |
|---|---|---|---|
| 3,311,987 | 4/1967 | Blazek | 73—504 UX |
| 3,371,540 | 3/1968 | Colombani et al. | 73—505 |

JAMES J. GILL, Primary Examiner

U.S. Cl. X.R.

137—81.5